US007083193B2

(12) United States Patent
Okamoto et al.

(10) Patent No.: US 7,083,193 B2
(45) Date of Patent: Aug. 1, 2006

(54) IGNITER FOR AIR BAG SYSTEM (75) Inventors: Mitsuyasu Okamoto, Himeji (JP);
Shingo Oda, Himeji (JP)

(73) Assignee: Daicel Chemical Industries, Ltd.,
Osaka (JP)

( * ) Notice: Subject to any disclaimer, the term of this
patent is extended or adjusted under 35
U.S.C. 154(b) by 63 days.

(21) Appl. No.: 10/374,107

(22) Filed: Feb. 27, 2003

(65) Prior Publication Data
US 2003/0234527 A1 Dec. 25, 2003

Related U.S. Application Data (60) Provisional application No. 60/361,714, filed on Mar. 6, 2002.

(30) Foreign Application Priority Data
Mar. 1, 2002 (JP) .............................. 2002-055527

(51) Int. Cl.
*B60R 21/26* (2006.01)
*B60R 21/16* (2006.01)
(52) U.S. Cl. ...................... 280/741; 280/735; 307/10.1
(58) Field of Classification Search ................ 280/735,
280/741; 307/10.1; 102/202.2, 202.5, 202.7,
102/202.9, 215, 218
See application file for complete search history.

(56) References Cited

U.S. PATENT DOCUMENTS
4,819,560 A  4/1989 Patz et al.

6,286,862 B1 * 9/2001 Blank et al. ................ 280/236
6,332,399 B1 * 12/2001 Laucht et al. ............... 102/206
6,418,853 B1  7/2002 Duguet et al.

FOREIGN PATENT DOCUMENTS
JP          2707250 B2    10/1997
JP        2000-241098 A    9/2000
JP        2000-513799 A   10/2000
JP        2001-171475 A    6/2001
WO       WO 98/36949 A1    8/1998
WO       WO 00/43727 A1    7/2000

OTHER PUBLICATIONS

Munger, A.C., "Electrothermal Response Testing, A Component Development Tool," Seventh International Pyrotechnics Seminar, Jul. 1980, pp. 461-478, vol. 1, IIT Research Institute, Vail, Colorado.

* cited by examiner

*Primary Examiner*—Lesley D Morris
*Assistant Examiner*—Joselynn Y. Sliteris
(74) *Attorney, Agent, or Firm*—Birch, Stewart, Kolasch & Birch, LLP (57) ABSTRACT The present invention provides an igniter for an air bag system which has an excellent operation performance and can be reduced in weight. A capacitor and an integrated circuit are provided in an igniter for an air bag system utilizing bus lines 10 and 11. In the integrated circuit, an impedance converting circuit is provided between the bus lines 10 and 11 and a rectifying circuit, and thereby, a capacitor with a large capacitance (μF order) can be charged with a small load capacitance (pF order).

25 Claims, 12 Drawing Sheets

IGNITER FOR AIR BAG SYSTEM

This nonprovisional application claims priority under 35 U.S.C. § 119(e) on U.S. Provisional Application No. 60/361,714 filed on Mar. 6, 2002 and under 35 U.S.C. § 119(a) on Patent Application No. 2002-55527 filed in Japan on Mar. 1, 2002, which are herein incorporated by reference.

TECHNICAL FIELD TO WHICH THE INVENTION BELONGS

The present invention relates to an igniter for an air bag system used in an air bag system utilizing a bus system, an integrated circuit for an air bag system, and a method for charging a capacitor provided in an igniter for an air bag system.

PRIOR ART

An air bag system for protecting a passenger from an impact at a time of collision of a vehicle is indispensable, and the air bag system needs to be reduced in weight based upon a demand for reducing the weight of a host vehicle. Recently, kinds and the total number of air bags such as an air bag for a driver side, an air bag for a passenger side next to the driver, an air bag for a rear seat side, and an air bag for a side impact are increasing, and therefore, a lighter air bag system is in greater demand.

In a current air bag system, an electronic control unit (ECU) connected to a power source (a battery in a vehicle) and an impact detecting sensor are individually connected to individual gas generators (a gas generator and an air bag are accommodated in a module case). An aspect of the connection between the ECU and the individual gas generators is shown in FIG. 11.

Figure 11:
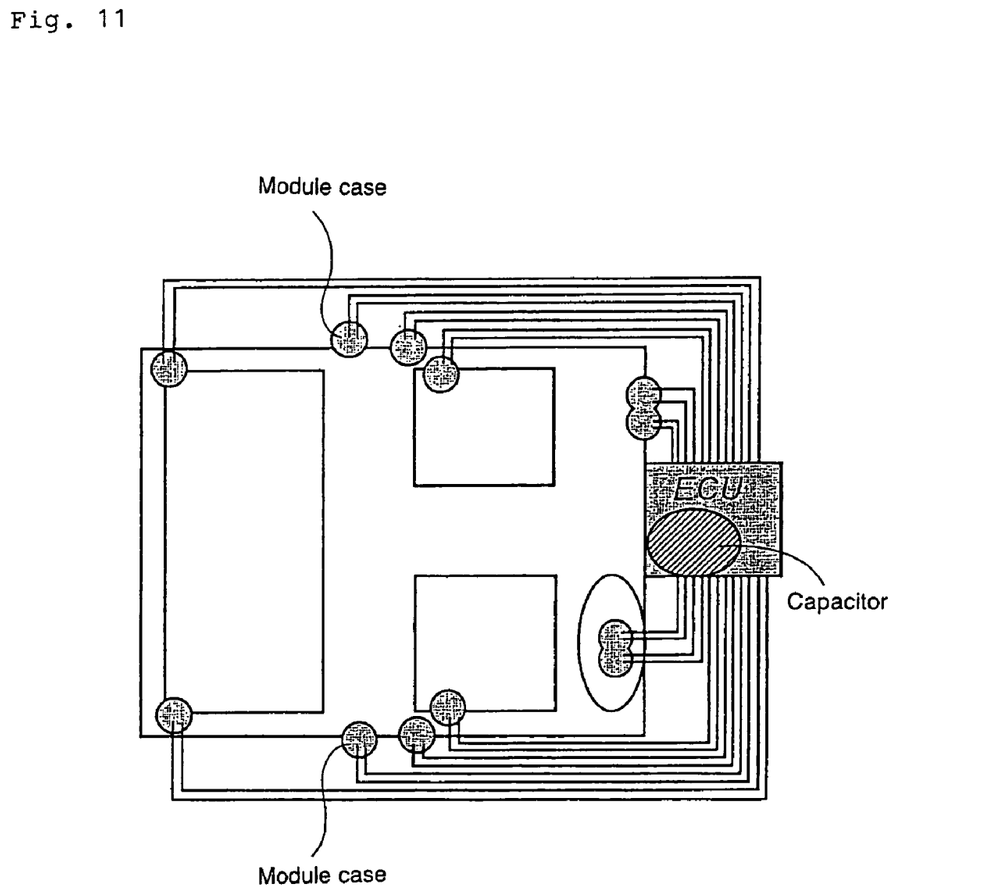
FIG. 11 is a diagram of a conventional air bag system.
Figure 12:
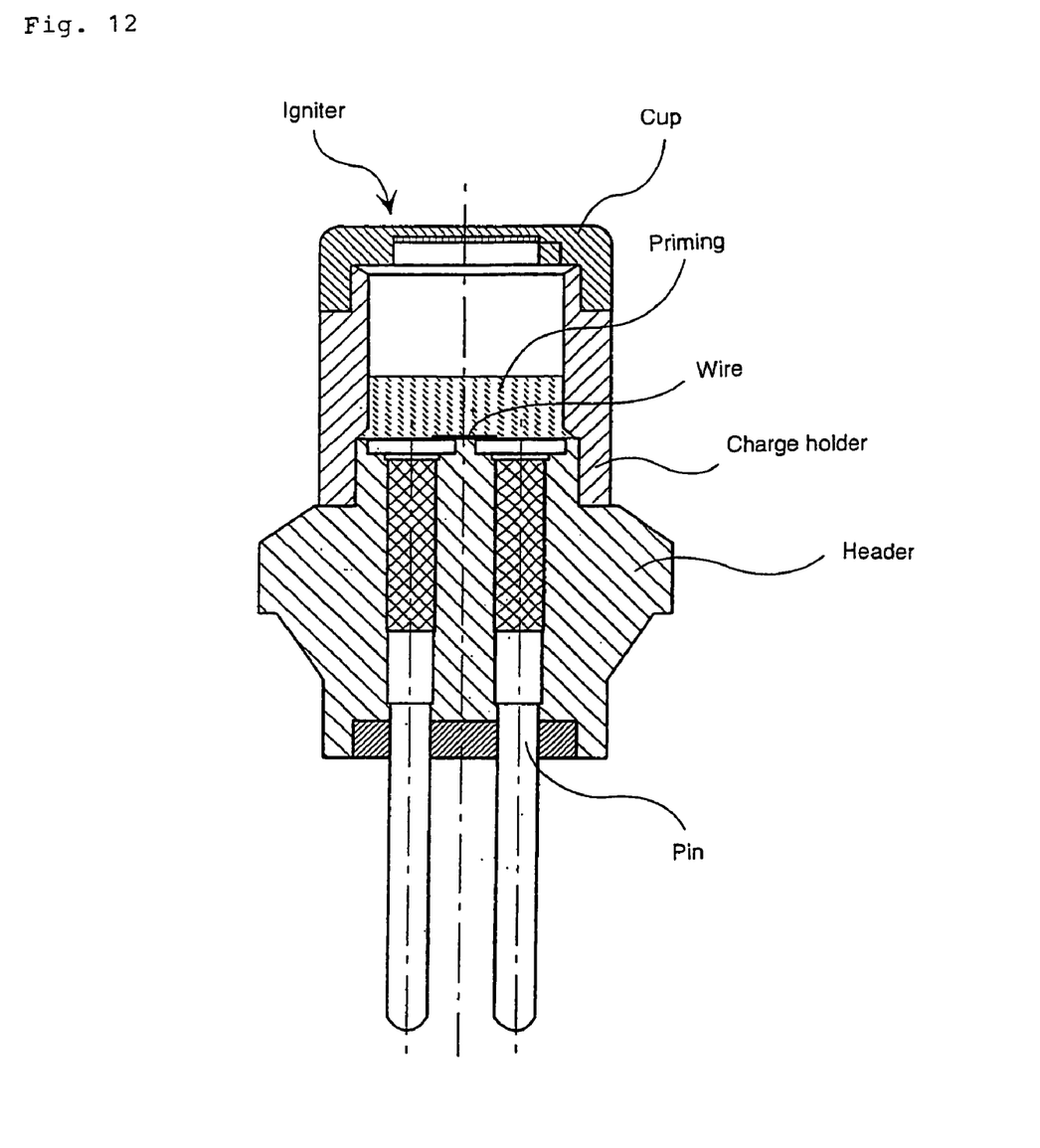
FIG. 12 is a vertical sectional view of an igniter used in the conventional air bag system.

As shown in FIG. 11, the ECU and an igniter (FIG. 12) of each of the individual gas generators are necessarily connected to each other through two conductors, and thereby, twice the conductors as the total number of igniters are required. Having many conductors contributes largely to weight increase in an air bag system. In view of constraints at a time of assembling vehicle parts, the ECU and the individual gas generators are not connected by only plural conductors but via plural connectors, and thereby, there occurs a serious problem such as a weight increase due to use of the connectors and a cost increase due to increase of the number of the connectors. Further, increase in volume (weight) of the ECU due to increase in volume of a capacitor incorporated into the ECU as a backup power source for activating all the igniters (serving at a time of a failure in line between the power source and the ECU) is another serious problem.

An air bag system is constituted by providing bus lines comprising plural loop wires passing through an ECU and connecting each of the individual gas generators to the bus line through two conductors (three or more conductors when occasion demands). In a case of such an air bag system, since only gas generators required corresponding to a collision situation of a vehicle are activated, an integrated circuit receiving information transmitted from the ECU and a capacitor supplying a current for activating an igniter are provided in each of the individual gas generators. In the case of utilizing a bus system, the total number of capacitors is increased, but since the capacitors are distributed and arranged in the ECU and the respective igniters, the capacitance and weight of the capacitor per igniter is reduced. As a result, since the weight of the capacitors in this case is remarkably reduced as compared with the weight of the capacitors for backup in the air bag system shown in FIG. 11, a large weight reduction is achieved as the whole system in addition to largely reducing the amount of conductors used. Incidentally, there have been known JP 2000-241098A, JP 2000-513799A and Japanese Patent No. 2707250 as the prior art utilizing the bus system.

DISCLOSURE OF THE INVENTION

The present invention provides an integrated circuit for an air bag system which achieves a large weight reduction in an entire air bag system by utilizing a bus system which ensures reliability and rapidness of operation similar to those in a conventional art, which obtains a high reliability, and provides an operation control method of an air bag system utilizing the same.

According to Automotive Safety Restraint Bus Specification Version 1.0 (2001/12/03 Philips electronics N. V, TRW Inc., Delphi Electronics Systems, Autoliv Inc., Special Devices Inc.,), a load capacity (a load capacity of a capacitor) of an initiator (Slave) corresponding to a bus system is defined to be an order of magnitude of 250 pF or less. Such a capacitor with a small capacity fails to heat a heat generating portion of an igniter securely at a time of system operation. Therefore, in order to improve the reliability at a time of an activation time of the igniter, it becomes necessary to use a capacitor with a capacitance having an order of magnitude exceeding 250 pF (hereinafter, a capacitance exceeding 250 pF is called "μF order"). However, when a capacitor with a capacitance of the μF order is used, such an abnormality of communication in the bus line is anticipated that most of a current flowing in a bus system (a bus line) is consumed for charging the capacitor so that a current necessary to develop other required functions can not be supplied.

In view of the above, the inventors of the present invention have found that a load capacity of an igniter viewed from a bus line can be made smaller than an actual load capacity thereof, namely, an igniter having a capacitor with an electrostatic capacitance of μF order can be made to appear to the bus line that the igniter has a capacitor with a capacitance of pF order. There is provided, in the integrated circuit provided with the igniter, a circuit for converting an impedance of a charging circuit for charging the capacitor with a current flowing in a bus line to control the charging current supplied from the bus line via the circuit to a level consistent with charging a capacitor of pF order.

The invention provides, as means for solving the above problem, an igniter for an air bag system, which is one or at least two igniters incorporated in the plurality of gas generators and used in an air bag system and an integrated circuit for controlling the igniters and the charging of the capacitors associated therewith.

In the air bag system, a bus line comprising plural loop wires which pass through the electronic control unit is provided to supply and transmit currents and required control information, and individual gas generators (accommodated in plural module cases, for example) are connected operationally by plural conductors branched at predetermined portions from the bus line.

The one or at least two igniters incorporated in each gas generator is each electric igniter which is provided with a heat generating portion and a priming coming in contact with the heat generating portion to ignite the priming by heat generation in response to an ignition current.

A capacitor and an integrated circuit recorded with information for developing required control functions are provided in the igniter; a charging circuit for charging a current for igniting the priming in the capacitor is provided; and a circuit for converting an impedance of the charging circuit is provided between the bus line and the capacitor.

By providing the circuit for converting an impedance of the charging circuit and performing a current supply to the capacitor from the bus line via the circuit for converting an impedance, a capacitor with a large capacitance (µF order) can be charged with a small load capacitance (pF order), so that a current flowing in the bus line is utilized for charging of the capacitor and development of another required function.

In the circuit for converting an impedance, it is preferable to use a MOS-FET or the like as a transistor which can use an emitter follower circuit including a transistor, and the transistor may be provided inside or outside the integrated circuit.

The capacitor to be charged can be provided inside or outside the integrated circuit, and its capacitance is preferably 250 pF to 24 µF, more preferably 250 pF to 12 µF, and further preferably 250 pF to 6 µF.

In the above invention, a rectifying circuit having a function for rectifying an alternating current to make the current flow into the capacitor as a direct current is provided between the bus line and the capacitor, and the circuit for converting an impedance is provided in a path between the bus line and the rectifying circuit.

Alternatively, the circuit for converting an impedance is provided between the rectifying circuit and the capacitor.

It is preferable that a function for amplifying at least one of a rectified voltage for charging a capacitor and a voltage applied to the bus line exists in the rectifying circuit.

In the above invention, it is preferable, in view of simplification of the entire system, that the impedance converting circuit is provided in the integrated circuit.

In the above invention, it is preferable that the impedance converting circuit has a function for controlling an upper limit of a current value. By giving such a function to the impedance converting circuit, when the capacitor is charged by a current (for example, 10 mA) from the bus line, a normal current flow in the bus line is not adversely impacted.

In the above invention, it is preferable that the integrated circuit has a circuit having a function for detecting abnormality of the heat generating portion of the igniter in the gas generator, a circuit having a function for identifying each of the plural gas generators, and a circuit having a function for detecting a malfunction of the capacitor.

A basic function of the integrated circuit is to receive a signal from the ECU in response to a situation occurring when a vehicle has experienced a collision and to activate a gas generator for properly protecting a passenger. In addition thereto, by providing the various functions described above, quality check of a product at a time of shipping and workability at a time of assembling are properly improved, and safety in actual use (while driving a vehicle) and the like can be also properly improved.

In the above invention, it is preferable that a circuit (noise counter measure circuit) for preventing the igniter from being activated erroneously due to noises made outside the igniter is further provided.

In the above invention, it is preferable that a discharging waveform converting circuit for converting a signal waveform of a current for igniting the priming stored in the capacitor for each igniter is further provided, and it is preferable that the discharging waveform converting circuit exists in the integrated circuit.

The invention further provides, a method for charging capacitors provided in igniters for an air bag system which comprises one or at least two igniters incorporated into a plurality of gas generators and an electronic control unit adapted to be connected to a power source and an impact detecting (collision) sensor in a bus line circuit configuration.

The priming is not limited to a specific one, but a combination of a metal or the like and an oxidizing agent such as perchlorate is preferable, a combination of a metal such as zirconium, titanium, and hafnium and perchlorate is more preferable, and a mixture (ZPP) of zirconium and potassium perchlorate is particularly preferable. Desirably, the ZPP is formed in particle shape and particle diameters of zirconium and potassium perchlorate are adjusted.

In the invention as above-described, the details of the circuit having the function for detecting abnormality of the heat generating portion of the igniter in the gas generator, the circuit having the function for identifying each of the plural gas generators, and the circuit having the function for detecting a malfunction of the capacitor are described in the following items (i) to (iii).

(i) The circuit having the function for detecting abnormality (failure in line or loose connection between the heat generating portion and the priming, or abnormality of a resistance value of the heat generating portion) of the heat generating portion of the igniter in the gas generator:

As one of conditions required for the gas generator to activate normally, a contacting state between the heat generating portion of the igniter and the priming has to be good (the heat generating portion and the priming has to be brought in press-contact with each other). For example, when there is a gap between the heat generating portion and the priming, it is considered that there occurs a malfunction such that the priming is not ignited when the igniter is actuated or an ignition is delayed. Further, when the heat generating portion is disconnected or has been half-disconnected, a similar malfunction occurs. For this reason, by recording information for detecting the malfunction in the integrated circuit, an inferior product can be removed at a time of shipping, and by detecting abnormality during use (while driving a vehicle), a prompt exchange can be performed.

Detecting theory for abnormality of the heat generating portion (Thermal Transient Test; issued on pages 461 to 478 in "Progress of International Pyrotechnic Seminar" on July 1980 by A. C. Munger) is as follows: when contacting state of a heat generating portion and a priming is good, an equivalent amount of heat to the heat generated by flowing of a constant current is conducted to the priming, so that the temperature of the heat generating portion does not rise so high. On the other hand, when the contacting state of the heat generating portion and the priming is bad, transfer of heat is less, so that the temperature rise of the heat generating portion becomes higher than a normal case. Therefore, a malfunction is detected by detecting a temperature change due to such a difference in contacting state as a resistance value change and utilizing a temperature coefficient of metal resistance [$r=r0(1+\alpha\Delta T)$] to obtain the temperature of the heat generating portion. More specifically, after a resistance r is measured when a current i which is too weak to raise the temperature up to igniting the igniter, a resistance R is measured when a current I of 10 to 15 times of the current i is flowed (the temperature of the heat generating portion becomes about 50 to 100° C., but the priming is not ignited with such a temperature), so that the resistance change due to the temperature change of the heat generating portion is obtained as a voltage change with comparisons of I and i and of R and r. Thus, such measurement information is recorded in the integrated circuit.

(ii) The function for identifying each of the plurality of gas generators:

For the gas generator for an air bag, various kinds of gas generators such as one for a driver side, one for a passenger side next to the driver, one for a side impact (for a side collision), one for a curtain air bag and the like have been practically used. For example, in the case of the gas generator for a side impact, a total of four gas generators are mounted for a driver side, a passenger side next to the driver and two rear seat sides respectively. For this reason, though different information pieces are recorded in the respective integrated circuits of the gas generators for the driver side, for the passenger side next to the driver, and for two rear seat sides, when these information pieces are recorded at a time of assembling the igniters or the gas generators or before assembling, since the igniters or the gas generators have the same appearance, it is necessary to distinguish the gas generators having the same appearance and having different information pieces recorded or the igniters having the same appearance before assembling. Furthermore, with one for a driver side mounted to a vehicle erroneously as one for a passenger side next to the driver, when activation information of an air bag for a driver side is sent from the ECU, an erroneous activation and inflation of the air bag for the passenger side next to the driver occurs eventually.

Therefore, by recording of information for developing identifying function for each of the plurality of gas generators after assembling of gas generators, after gas generators are assembled in module cases or after gas generators are mounted to a vehicle, storage, transportation, management and the like of gas generators can be made easy, so that a mistake or a confusion is prevented from occurring at a time of mounting of gas generators.

It is preferable that the information pieces for developing an identifying function for each of the plurality of gas generators are recorded after assembling the gas generators. It is more preferable that the information pieces are recorded after the gas generators are assembled in the module cases, and it is further preferable that the information pieces are recorded after the module cases are mounted to a vehicle.

(iii) The function for detecting a malfunction of the capacitor:

The information for developing a function for detecting a malfunction of the capacitor also includes confirmation information of a mounted state (soldered state) of a capacitor to a substrate and the like in addition to information for measuring a pulse response or a dielectric dissipation factor.

After mounted to the vehicle, since the capacitor repeats charging and discharging, the capacitor deteriorates with age. However, abnormality is detected during use (while driving a vehicle) by recording information which can confirm a malfunction due to this deterioration in the integrated circuit in advance, so that a prompt exchange can be performed. Furthermore, by recording information for confirming the soldered state in advance, an inferior product can be removed at a time of shipping.

The details of the noise countermeasure circuit are as follows:

For example, when a large current flows at a time of activating a cell motor in a vehicle, in case of not providing a noise preventing circuit, there is a possibility that a noise (a noise causing an uncomfortable unusual sound occurrence while listening to the radio) generated due to this current is transmitted from a vehicle body to flow in an igniter. Because the noise is transmitted in this manner, a possibility that an igniter causes an erroneous activation becomes high. Accordingly, by mounting a device constituted to prevent a current from flowing from a vehicle side to an igniter side, for example, a diode or a varistor (a non-linear resistance element) as the noise countermeasure circuit (a circuit for preventing an igniter from being activated erroneously), the above-described erroneous activation of the igniter can be prevented.

The details of the discharging waveform converting circuit are as follows:

The discharging waveform converting circuit has a function for converting a discharging waveform expressed by the following equation (I) to a triangular wave or a trapezoidal wave:

$$i(t)=(V0/R) \times e^{-t/CR} \qquad (I)$$

(In the equation, v0 represents a capacitor charging voltage (V), R represents a circuit resistance (Ω), C represents a capacitor capacitance (μF), t represents a time (μ sec), and i represents a current (A)). Besides, in order to give a similar converting function, a coil can be interposed in a connection circuit between the capacitor and the heat generating portion, and the discharging waveform converting circuit can also be provided in the integrated circuit in view of simplification of the entire system.

According to the air bag system employing the present invention, the weight of the entire air bag system can be reduced substantially without sacrificing performance by utilizing the bus system.

EMBODIMENT OF THE INVENTION

An air bag system of the present invention achieves reduction in weight of the entire system by using a bus line and achieves reliability of an operation of the system by the above-described solutions. Embodiments including the above-described solutions will be explained below.

Figure 1:
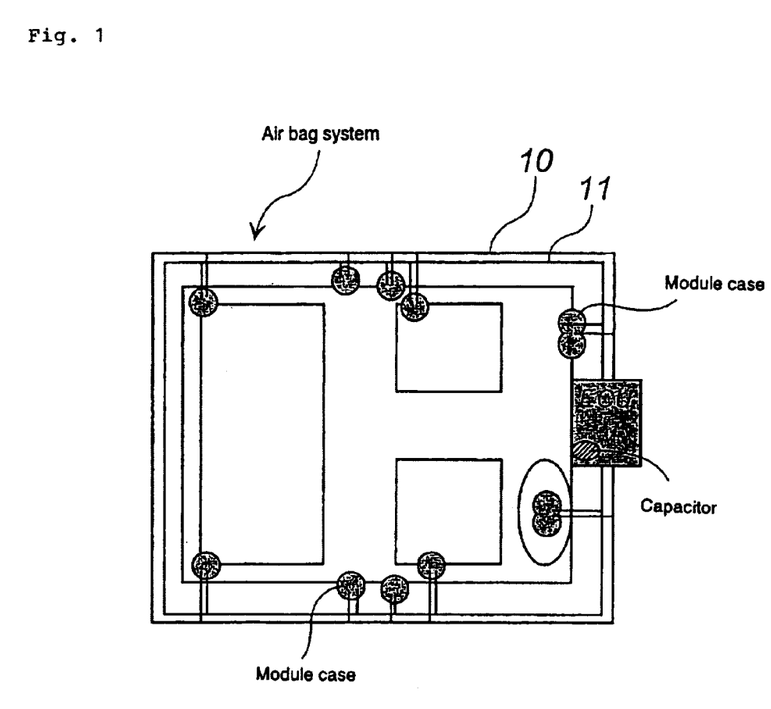
FIG. 1 is a diagram of an air bag system employing the present invention.

As shown in FIG. 1, an air bag system employing the present invention uses bus lines 10 and 11 comprising two loop wires passing through an ECU. The ECU is connected to a power source (a battery in a vehicle) and an impact detecting sensor which are not illustrated, and a capacitor for backup, when a conductor connecting the ECU and the power source is disconnected by an impact at a collision time of a vehicle in which these elements are disposed. Incidentally, in the air bag system employing the present invention, since a capacitor is disposed at each of the respective gas generators (igniters), the capacitor for backup may be one with a small capacitance (i.e., light weight), but the capacitor serving for backup in the conventional air bag system shown in FIG. 11 has to have a large capacitance in order to activate all the gas generators by itself at a time of failure of a lead wire between the battery and the ECU.

Gas generators and air bag are provided in a required number of module cases (which are indicated by black circles mounted to a vehicle are connected to the bus lines 10 and 11 to be actuated, by two conductors (or three or more conductors when occasion demands).

Figure 2:
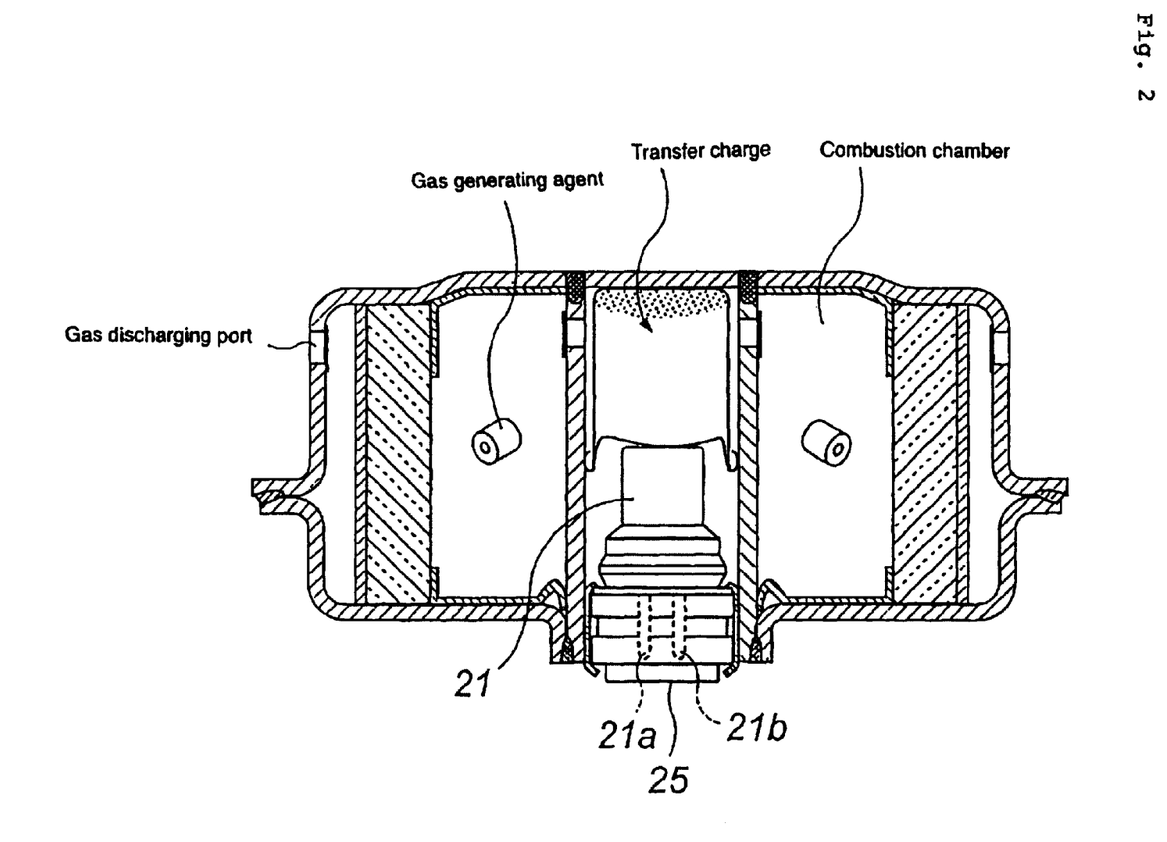
FIG. 2 is an axial sectional view of a gas generator (including one igniter) used in the air bag system employing the present invention.
Figure 3:
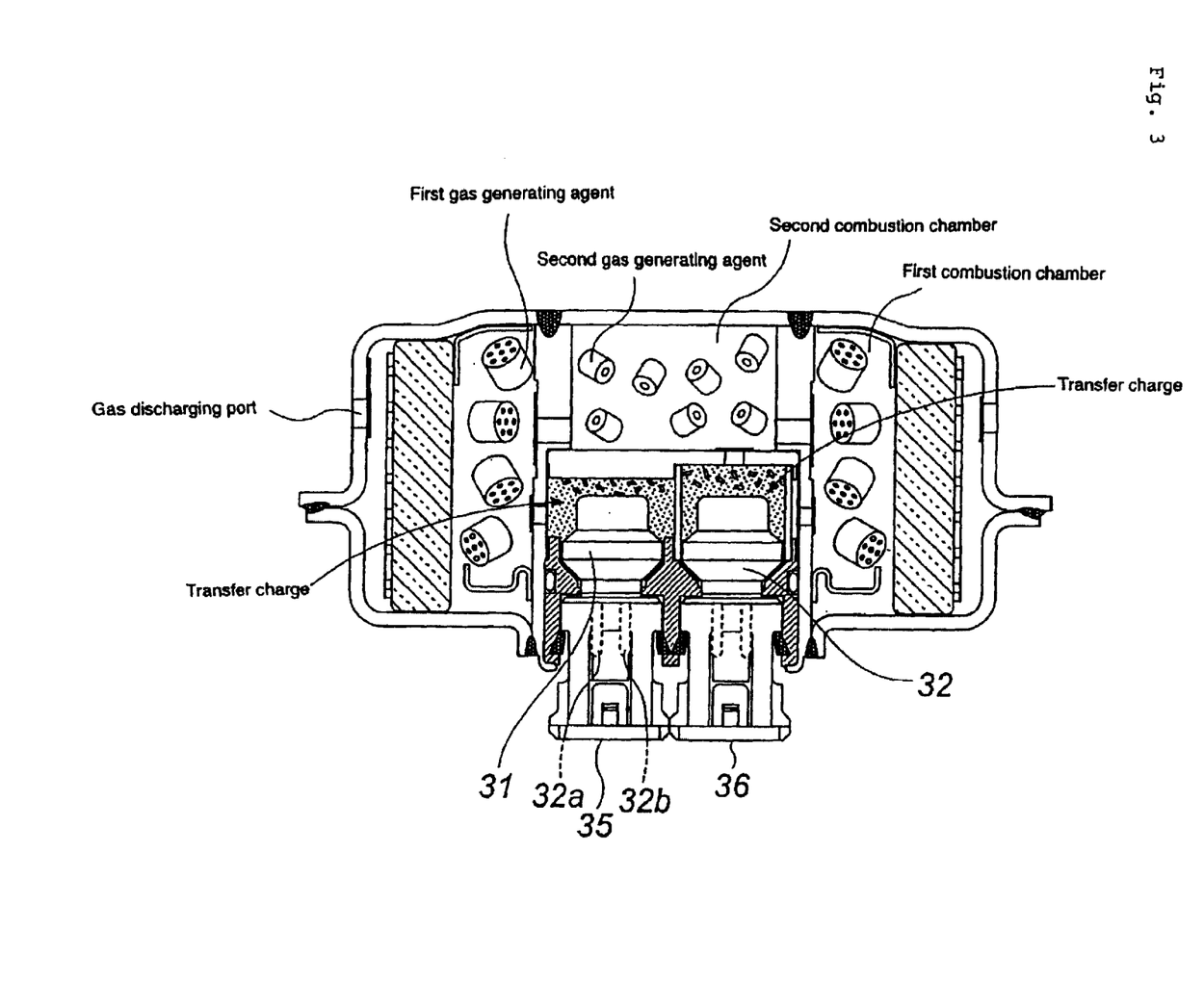
FIG. 3 is an axial sectional view of a gas generator (including two igniters) used in the air bag system employing the present invention.

The gas generators in the air bag system shown in FIG. 1, can be those shown in FIG. 2 or FIG. 3 corresponding to the number of the igniters. FIG. 2 is an axial sectional view of a single type gas generator (an igniter 21) in which one igniter is provided, and FIG. 3 is an axial sectional view of a dual type gas generator (igniters 31 and 32) in which two igniters are provided.

In the single type gas generator, two (or three or more when occasion demands) pins 21a and 21b are provided in the igniter 21 and they are connected to the bus lines 10 and 11 through a connector 25.

In the dual type gas generator, two (or three or more when occasion demands) pins 31a and 31b are provided in an igniter 31, two (or three or more when occasion demands) pins 32a and 32b are provided in an igniter 32, and the igniters are respectively connected to the bus lines 10 and 11 through respective connectors 35 and 36.

Figure 4:
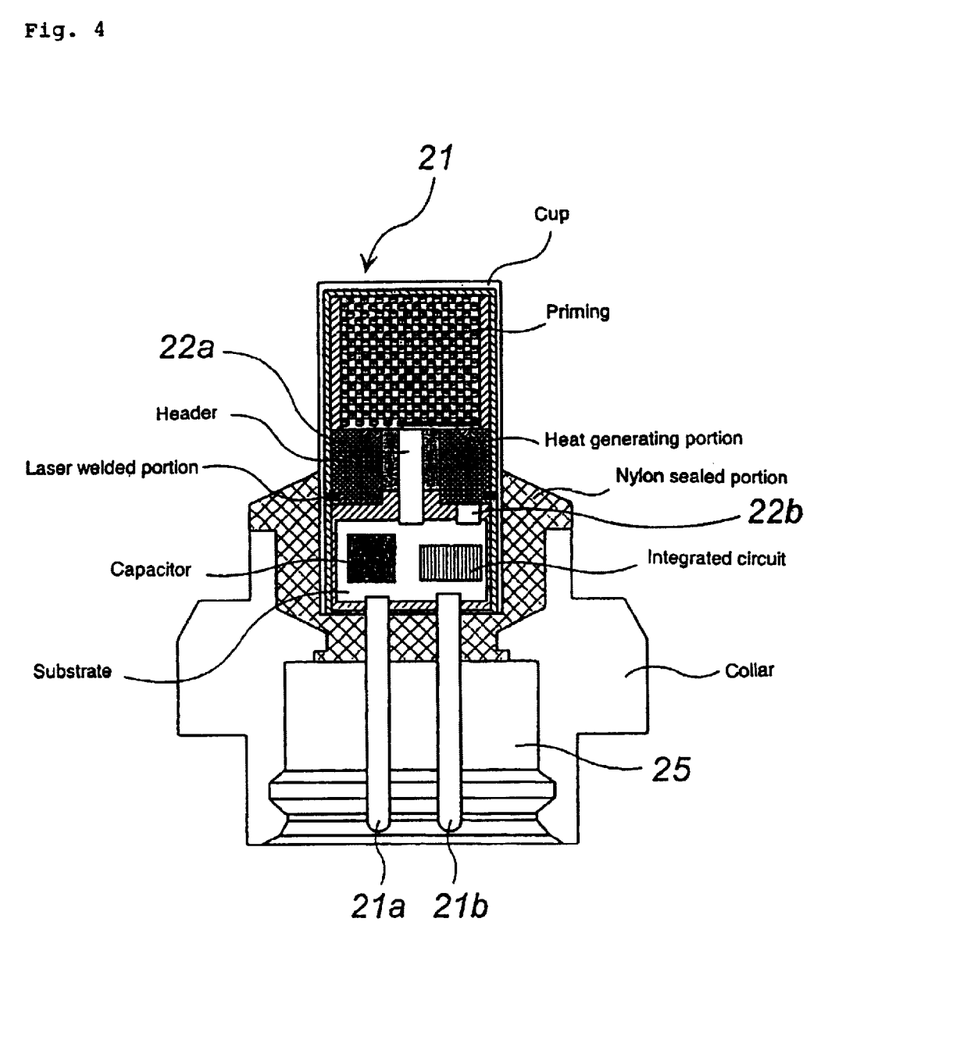
FIG. 4 is a vertical sectional view of an igniter used in the air bag system employing the present invention.
Figure 5:
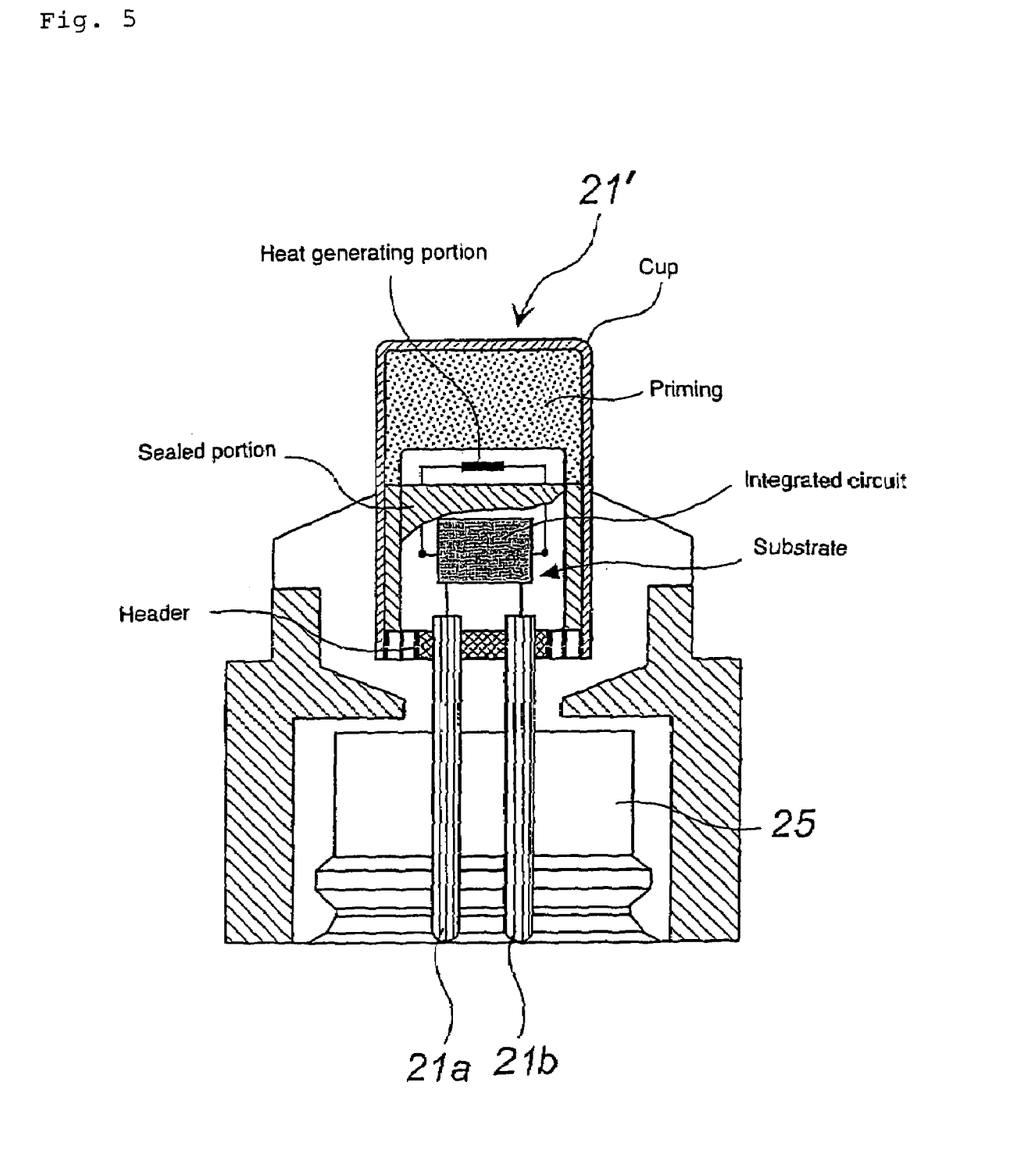
FIG. 5 is a vertical sectional view of another embodiment of an igniter used in the air bag system employing the present invention.

As the igniter 21 and the igniters 31 and 32 in the gas generators shown in FIG. 2 and FIG. 3, for example, one shown in FIG. 4 or FIG. 5 can be used. FIG. 4 and FIG. 5 show vertical schematic sectional views of igniters, and since igniters having the same structure can be used as the igniter 21, as well as the igniters 31 and 32, the igniter 21 will be explained below.

In the igniter 21 shown in FIG. 4, a heat generating portion is provided on a glass header, an igniting agent (for example, ZPP) is charged to come in pressure-contact with the heat generating portion, and a substrate provided with a capacitor and an integrated circuit in which information for developing required functions has been recorded is disposed in a lower portion of the igniter 21. The integrated circuit, and the heat generating portion and the capacitor are respectively connected by two conductors 22a and 22b, and the integrated circuit is further connected to the pins 21a and 21b through suitable conductors.

In the igniter 21 shown in FIG. 5, a substrate is provided on a glass header. An integrated circuit, in which information for developing required functions has been recorded, and a heat generating portion are provided on one surface of the substrate, and a capacitor (not shown) is provided on the other surface. The substrate is sealed by insulating material such as epoxy resin except for the heat generating portion, and only the heat generating portion comes in contact with a priming substance in the igniter 21'.

Figure 6:
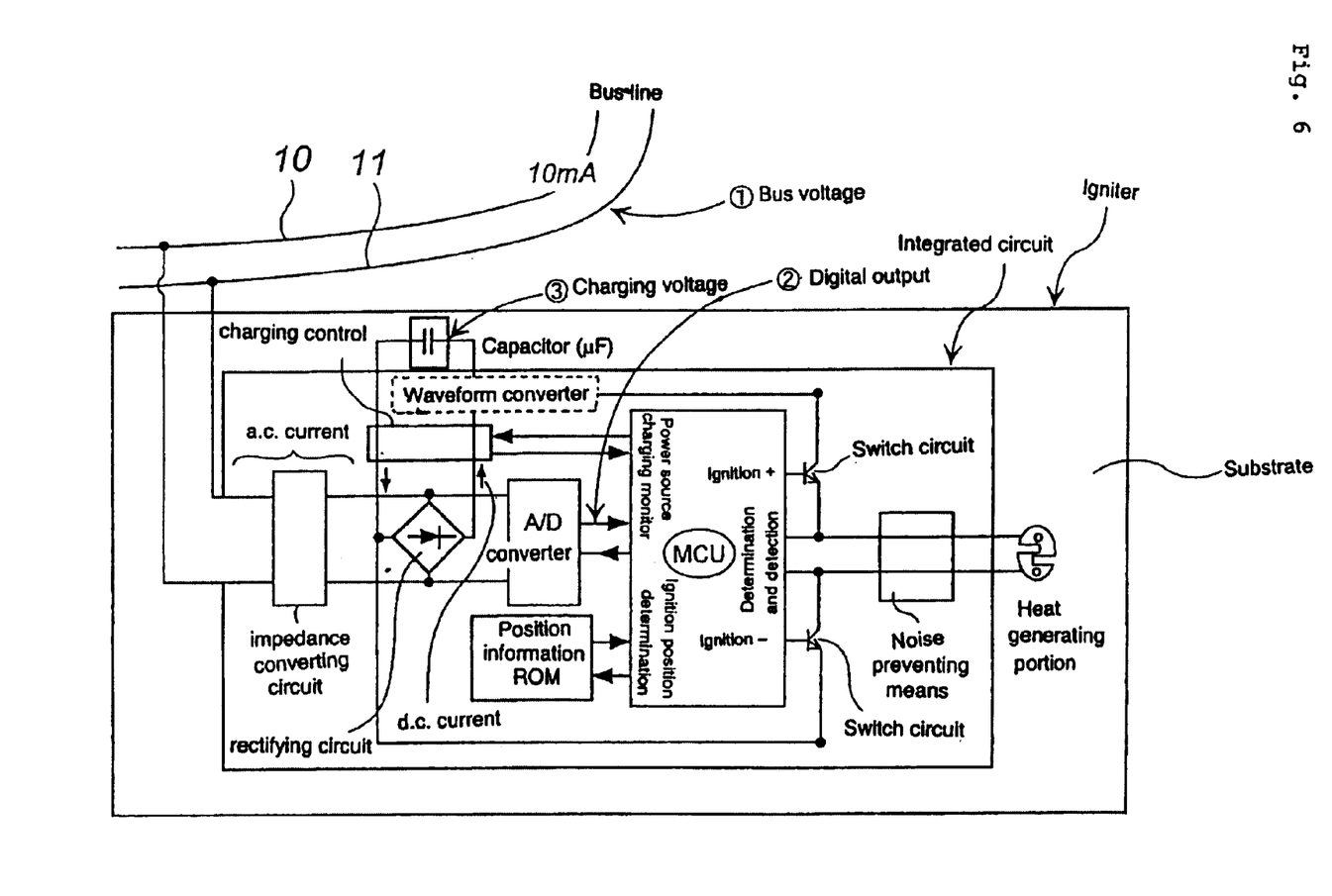
FIG. 6 is a conceptual diagram of an igniter used in the air bag system employing the present invention.
Figure 7:
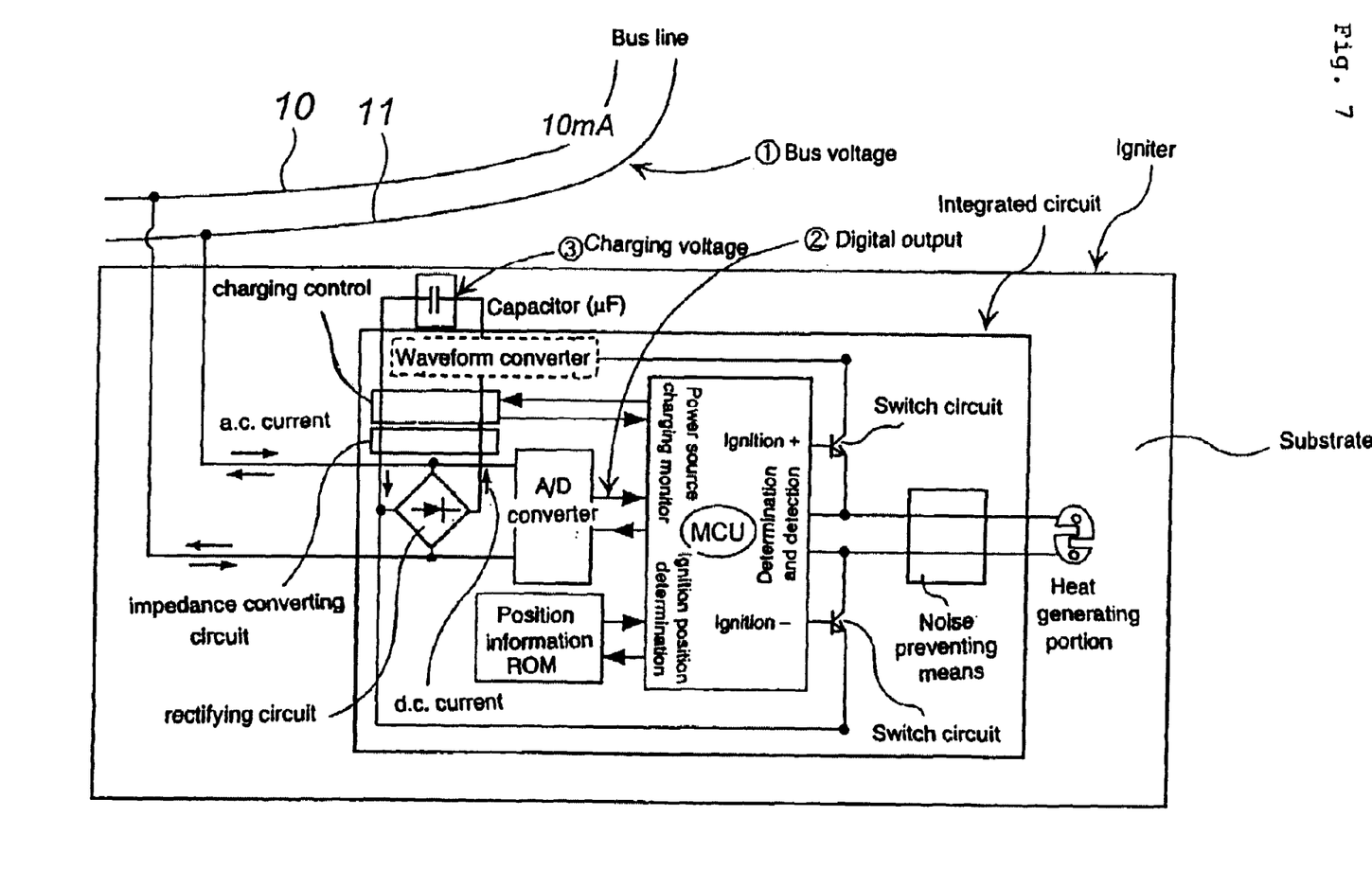
FIG. 7 is a conceptual diagram of an igniter used in the air bag system employing the present invention.
Figure 8:
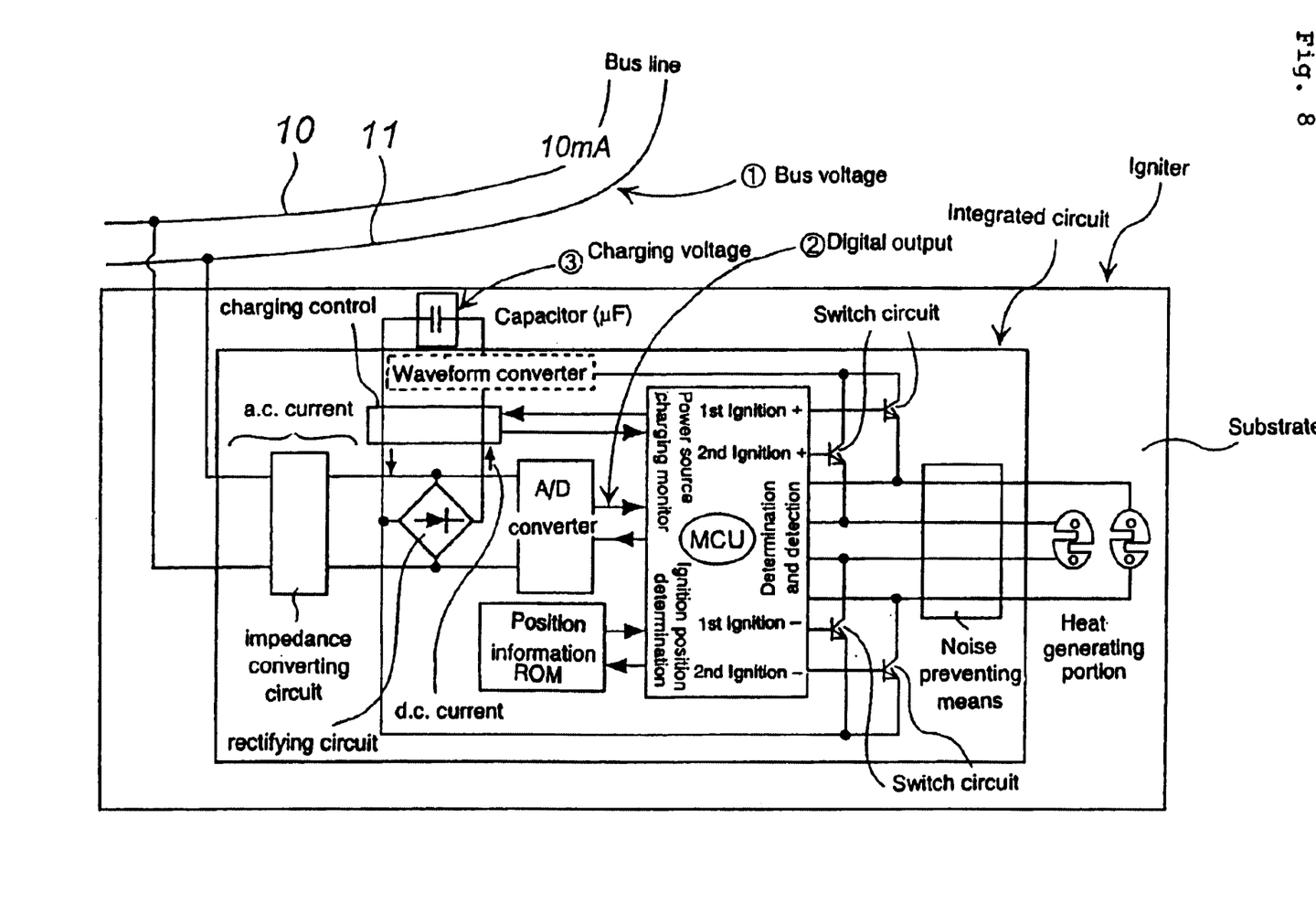
FIG. 8 is a conceptual diagram of an igniter used in the air bag system employing the present invention.
Figure 9:
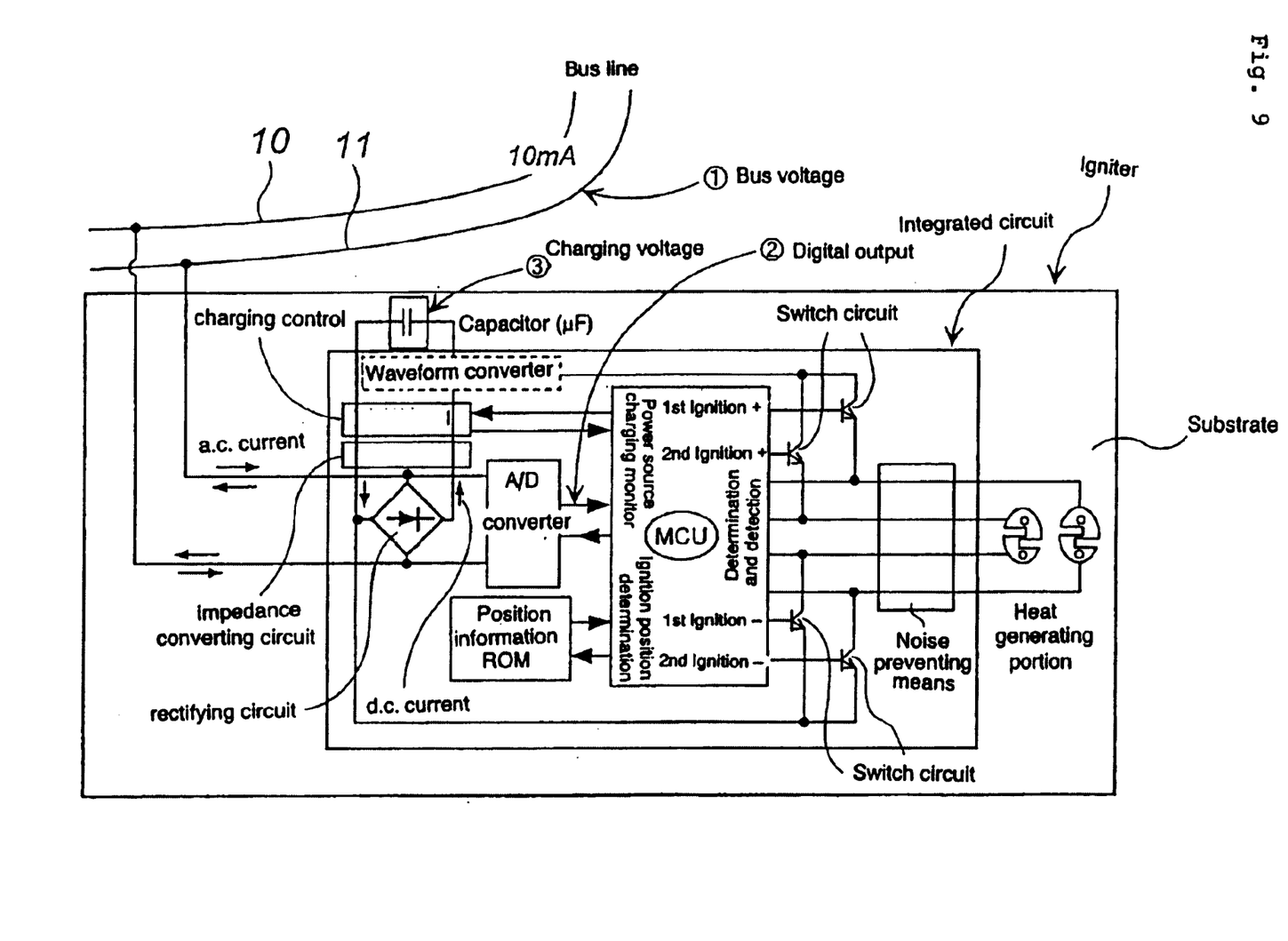
FIG. 9 is a conceptual diagram of an igniter used in the air bag system employing the present invention.
Figure 10:
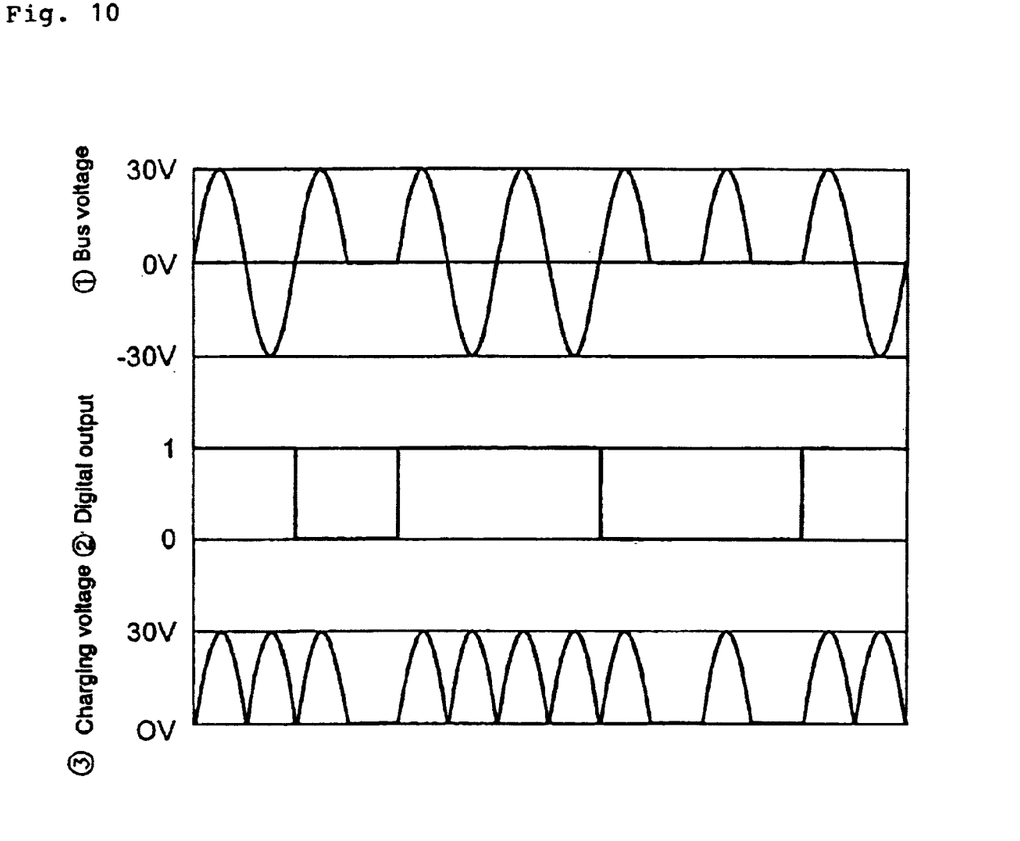
FIG. 10 is a pulse waveform diagram of a bus voltage, a digital output and a charging voltage shown in FIG. 5 to FIG. 9.

The capacitor or the like provided inside of the igniter shown in FIG. 4 or FIG. 5, or the substrate on which the integrated circuit is disposed may be constituted to have one of the structures shown in the conceptual diagrams in FIG. 6 to FIG. 9. FIG. 6 and FIG. 7 show a single heat generating portion, and FIG. 8 and FIG. 9 show two heat generating portions. Incidentally, FIG. 10 shows representative pulse waveforms of the bus voltages, digital outputs, and charging voltages shown in FIG. 6 to FIG. 9.

In FIG. 6 to FIG. 9, a capacitor and an integrated circuit including any other required circuit are disposed on a substrate, and an impedance converting circuit is provided in a charging circuit from the bus lines 10 and 11 to the capacitor.

In FIG. 6 and FIG. 8, among the currents from the bus lines 10 and 11 are those for charging the capacitor and providing required control information. A rectifying circuit having a function for rectifying an alternating current to make the current flow into the capacitor as a direct current is provided between the bus lines 10 and 11 and the capacitor, and the impedance converting circuit is provided in a charging circuit from the bus lines 10 and 11 to the capacitor via the rectifying circuit.

In FIG. 7 and FIG. 9, among the currents from the bus lines 10 and 11 are those for charging the capacitor and providing required control information. A rectifying circuit having a function for rectifying an alternating current to make the current flow into the capacitor as a direct current is provided between the bus lines 10 and 11 and the capacitor, and the impedance converting circuit is provided in a charging circuit from the bus lines 10 and 11 to the capacitor via the rectifying circuit.

In FIG. 6 to FIG. 9, a discharging waveform converting circuit (represented with the broken line as "a waveform converter") can be provided, if required, and the discharging wave form converting circuit itself can be incorporated into the integrated circuit.

In FIG. 6 to FIG. 9, a switch circuit (a transistor) is provided which shuts off a current when it is unnecessary to activate an igniter and starts supplying of a current at an activation time of the igniter. When the switch circuit is opened, a current stored in the capacitor does not flow into the heat generating portion.

In FIG. 8 and FIG. 9, two heat generating portions share one capacitor, an integrated circuit in which information for developing required functions has been recorded, and a discharging waveform converting circuit provided if required.

When the gas generator has two igniters 31, 32, as shown in FIG. 3, three operation aspects such that a case of activating only either one of the igniters, a case of first activating one of the igniters and then activating the other with a slight delay, and a case of simultaneously activating the two igniters are considered according to a collision state of a vehicle, and, the integrated circuit of the igniter shown in FIG. 8 or FIG. 9 is recorded with such information to make two heat generating portions generate heat according to each of the above-described three instruction from the ECU (FIG. 1). The igniters 31 and 32 of the gas generator shown in FIG. 3 can be made to have the structures shown for the "heat generating portion" in FIG. 6, FIG. 7, or in FIG. 8, FIG. 9.

The integrated circuits including the capacitor, the impedance circuit, the rectifying circuit or the like on the substrates shown in FIG. 6 to FIG. 9 are connected to the bus lines 10 and 11 through the pins 21a and 21b.

After a current and control information supplied from the bus lines 10 and 11 are sent to the integrated circuit, they are converted to digital outputs by an A/D converter (an analog/digital converter) to be sent to an MCU (a Micro Computer Unit). Thereafter, an instruction is sent from the MCU such that charge control information, position identification information, a failure-detecting information of a heat generating portion or a resistance value change detecting information is exhibited and the current is used for charging the capacitor, but it is not used to make the heat generating portion generate heat.

A varistor (non-linear resistance element) is disposed in a circuit between the MCU and the heat generating portion as noise preventing means, and it serves such that the igniter is not activated erroneously due to a noise generated outside the igniter.

The heat generating portion is put in contact with the priming, and it generates heat by a current supplied only from the capacitor to ignite the priming.

Next, an operation of the air bag system employing the present invention will be explained with reference to FIG. 1 to FIG. 9.

When a vehicle runs normally, failure-detecting information or resistance value change detecting information of the heat generating portion, detecting information for a malfunction of the capacitor, and detecting information about whether or not an igniter including an identifying function required for activating a gas generator (detecting information about whether or not an igniter having an identification function for activating a gas generator required for a driver side, a passenger side next to the driver or the like properly at a time of collision is disposed rightly, or whether or not another igniter having the same identifying function is disposed in a duplicated manner) is sent from the ECU to the gas generator (the integrated circuit arranged in the igniter) through the bus lines 10 and 11 so that whether or not there is abnormality in these members is checked. When there is an abnormality, an alarm lamp activated in linkage with the air bag system, or the like informs the abnormality, so that an early exchange of parts can be conducted to recover the safety.

Further, the capacitor of each igniter can be charged from the power source. At this time, a current supplied from the power source through the bus lines 10 and 11 is about 10 mA, and an electrostatic capacitance of the capacitor in the igniter is about μF order of magnitude. For this reason, when a current is directly supplied to the capacitor from the bus lines 10 and 11, most of the current is used for charging the capacitor, which prevents each above-described function from being exhibited sufficiently. However, since the impedance converting circuit is provided in the charging circuit as shown in FIG. 6 to FIG. 9, a capacitor with a large load capacitance (μF order of magnitude) can be charged as if it were a small load capacitance (pF order of magnitude), so that a current flowing in the bus lines 10 and 11 can be utilized not only for charging a capacitor but also for developing the other required functions.

When a vehicle provided with the air bag system experiences a collision, information from the impact detecting sensor is sent to the ECU, and information from the ECU is sent, via the bus lines 10 and 11, to a gas generator (the integrated circuit provided in the igniter) required to inflate an air bag for ensuring a safety for a vehicle occupant. By sending a control pulse instructing opening or closing of the switch circuit from the MCU, the switch circuit is opened or closed.

If the switch circuit is applied with, for example, a current pulse with a waveform width of 100 μsec from the MCU, the switch is closed for 100 μsec and it allows a current from the capacitor to flow in the heat generating portion of the igniter as a pulse with a width of 100 μsec. That is, the switch circuit closes a switch while a current (a control pulse) is flowing in the switch circuit like a case of using a thyristor, a MOS-FET, or a bipolar transistor as the switch circuit. In this manner, by applying a pulse with a predetermined time width (20 to 500 μsec) to the heat generating portion of the igniter, the heat generating portion is caused to generate heat with a required igniting energy to ignite and burn the priming.

By using such an igniter for an air bag system (or the integrated circuit), an amount of current (an amount of igniting energy) required for activating the individual igniters normally is reduced, so that an amount of current (an amount of igniting energy) required for activating the entire igniters normally is also reduced. As a result, a capacitance (namely, a weight) of the capacitor for a backup power source can be made small and the ECU itself can be made small. Accordingly, the weight of the entire air bag system can be reduced.

By igniting and burning the priming, the transfer charge in the gas generator in FIG. 2 or FIG. 3, and further the gas generating agent in the combustion chamber in FIG. 2, or the first gas generating agent in the first combustion chamber and the second gas generating agent in the second combustion chamber in FIG. 3 are ignited and burnt to generate a gas, and the gas is discharged from the gas discharging ports, thereby inflating an air bag accommodated in the module case together with the gas generator. In the gas generator in FIG. 3, the igniters 31 and 32 can be activated simultaneously or with a staggered time, or only the igniter 31 can be activated, as required.

The air bag system as shown in FIG. 1, is provided with a module case accommodating the gas generator for an airbag shown in FIG. 2 or FIG. 3 and the air bag, and it can be constituted to be the same as the one specifically described on paragraphs 0096 to 0102 in JP-A 11-334517 and further, as the one shown in FIG. 17 thereof.

The igniter for an air bag system and the integrated circuit for an air bag system of the present invention can be applied as an igniter incorporated into various inflators (gas generators) such as an inflator for an air bag for a driver side, an inflator for an air bag for a passenger side next to the driver, an inflator for a side air bag, an inflator for a curtain air bag, an inflator for a knee-bolster air bag, an inflator for an inflatable seat belt, an inflator for a tubular system, and an inflator for a pretensioner, and an integrated circuit provided in the igniter.

The invention claimed is:

1. An igniter for an air bag system, said air bag system including a bus line that is connected to an electronic control unit for providing a charging current on said bus line, said igniter comprising:
    a heat generating portion;
    a priming in contact with said heat generating portion;
    a capacitor for accumulating electric charge for heating said heat generating portion;
    a charging circuit for charging the capacitor with charging current provided on said bus line; and
    a circuit for converting an impedance of the charging circuit provided between the bus line and the capacitor for controlling the magnitude of charging current provided to the capacitor.

2. The igniter for an air bag system according to claim 1, wherein the capacitance of the capacitor is 250 pF to 24 μF.

3. The igniter for an air bag system according to claim 1 or 2, in which the charging circuit includes a rectifying circuit having a function for rectifying an alternating current to make the current flow into the capacitor as a direct current and is further provided between the bus line and the capacitor, and the circuit for converting an impedance is provided in a path between the bus line and the rectifying circuit.

4. The igniter for an air bag system according to claim 1 or 2, in which the charging circuit includes a rectifying circuit having a function for rectifying an alternating current to make the current flow into the capacitor as a direct current and is further provided between the bus line and the capacitor, and the circuit for converting an impedance is provided between the rectifying circuit and the capacitor.

5. The igniter for an air bag system according to claim 3, wherein said rectifying circuit further includes a function for amplifying at least one of a rectified voltage for charging the capacitor and a voltage applied to the bus line.

6. The igniter for an air bag system according to claim 1 or 2, including an integrated control circuit and wherein the impedance converting circuit is provided inside the integrated control circuit.

7. The igniter for an air bag system according to claim 1 or 2, wherein the impedance converting circuit is provided with a function for controlling an upper limit of a current value.

8. The igniter for an air bag system according to claim 1 or 2, including an integrated control circuit wherein the integrated control circuit has a circuit having a function for detecting abnormality of the heat generating portion of the igniter in a gas generator, a circuit having a function for identifying each of a plurality of gas generators and a circuit having a function for detecting a malfunction of the capacitor in said igniter.

9. The igniter for an air bag system according to claim 1 or 2, in which a circuit for preventing the igniter from being activated erroneously by a noise generated outside of the igniter is further provided.

10. The igniter for an air bag system according to claim 1 or 2, further comprising:
    a discharging waveform converting circuit which converts a signal waveform of a current for igniting an igniter stored in the capacitor.

11. The igniter for an air bag system according to claim 10, including an integrated control circuit and wherein the discharging waveform converting circuit exists in the integrated control circuit.

12. An integrated circuit provided in one or more igniters incorporated into each of a plurality of gas generators in an air bag system, the air bag system including a bus line connected to an electronic control unit for providing a charging current on said bus line and each of said igniters includes a capacitor to be charged,
    said control unit further providing igniter identification information on said bus line,
    said integrated circuit comprising:
        charging circuit for charging an associated capacitor for said igniter with charging current provided on said bus line; and
        a circuit for converting an impedance of the charging circuit provided between the bus line and said associated capacitor for controlling the magnitude of charging current provided to that capacitor.

13. The integrated circuit according to claim 12, wherein the capacitance of said associated capacitor is 250 pF to 24 µF.

14. The integrated circuit according to claim 12 or 13, in which the charging circuit includes a rectifying circuit having a function for rectifying an alternating current to make the current flow into the capacitor as a direct current and is further provided between the bus line and the capacitor, and the circuit for converting an impedance is provided in a path between the bus line and the rectifying circuit.

15. The integrated circuit according to claim 12 or 13, in which the charging circuit includes a rectifying circuit having a function for rectifying an alternating current to make the current flow into the capacitor as a direct current and is further provided between the bus line and the capacitor, and the circuit for converting an impedance is provided between the rectifying circuit and the capacitor.

16. The integrated circuit according to claim 14, wherein a function for amplifying at least one of a rectified voltage for charging the capacitor and a voltage applied to the bus line exists.

17. The integrated circuit according to claim 12 or 13, wherein the impedance converting circuit is provided with a function for controlling an upper limit of a current value.

18. The integrated circuit according to claim 12 or 13, wherein the integrated circuit has a circuit having a function for detecting abnormality of a heat generating portion of the igniter, a circuit having a function for identifying each of the plurality of gas generators, and a circuit having a function for detecting a malfunction of the capacitor.

19. The integrated circuit according to claim 12 or 13, further comprising:
    a circuit for preventing the one or more igniters from being activated erroneously by a noise generated outside of the igniter.

20. The integrated circuit according to claim 12 or 13, in which a discharging waveform converting circuit which converts a signal waveform of a current for igniting an igniter stored in the capacitor for each igniter is further provided.

21. The integrated circuit according to claim 20, wherein the discharging waveform converting circuit exists in the integrated circuit.

22. A gas generator for an air bag system, comprising:
    a housing having a gas discharging port;
    an igniter according to claim 1 activated by an impact; and
    one or more combustion chambers storing a gas generating agent ignited and burnt by the igniter to generate a combustion gas for inflating an air bag.

23. An air bag system, comprising
    a gas generator for an air bag which includes,
        a housing having a gas discharging port,
        an igniter for an air bag system according to claim 1 activated by an impact, and
        one or more combustion chambers storing a gas generating agent ignited and burnt by the igniter to generate a combustion gas for inflating an air bag;
    an air bag which introduces a gas generated in the gas generator therein to inflate; and
    a module case which accommodates the air bag.

24. A method for charging a capacitor in an igniter connected to a bus line in an air bag system, comprising:
    providing a charging current on said bus line;
    receiving said charging current in a charging circuit associated with said capacitor; and
    converting an impedance of said charging circuit presented to said bus line to control the magnitude of charging current provided to said capacitor.

25. The method of claim 24 including imposing an upper limit to the magnitude of said charging current.

* * * * *